Patented Jan. 7, 1947

2,413,834

UNITED STATES PATENT OFFICE 2,413,834

SUBSTITUTED 4,4'-DIAMINODIPHENYL SULFONES AND PROCESS OF MAKING SAME

Lucas P. Kyrides, St. Louis, Mo., assignor to Monsanto Chemical Company, St. Louis, Mo., a corporation of Delaware No Drawing. Original application March 20, 1943, Serial No. 479,915. Divided and this application October 3, 1945, Serial No. 620,158

8 Claims. (Cl. 260—397.6)

1

This invention relates to certain new derivatives of 4,4'-diaminodiphenyl sulfone and to the process of producing them.

This application is a division of my co-pending application, Serial Number 479,915, filed March 20, 1943.

These new products have been found to possess therapeutic activity in the treatment of various diseases.

These new derivatives may be represented by the following general formula:

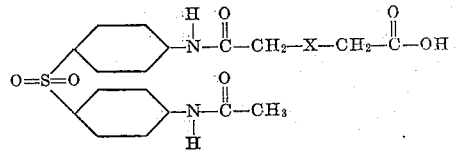

in which X represents a sulfide, disulfide, thionyl, sulfone or oxygen residue.

In preparing these new products, the procedure in general is the following:

To a solution (or suspension) of one molecular equivalent of 4,4'-diaminodiphenyl sulfone in a suitable solvent, such as acetone, methyl alcohol, ethyl alcohol, ethylene glycol or dioxane, is added two molecular equivalents of the anhydride halide or mono-ester acyl halide of an acid selected from the group consisting of diglycolic acid, thiodiglycolic acid, dithiodiglycolic acid, thionyl diglycolic and sulfondiacetic acids. The reaction mixture is desirably refluxed for several hours and the solvent thereupon removed by evaporation under reduced pressure. The residue and oil are solidified by treatment with water. The solid material is filtered off and dried. The product may be purified by dissolution in alcohol, filtration through charcoal, addition of water and agitation until crystallization of the product is effected. Prepared in this manner, the product may retain some water of crystallization, which may be removed if desired by drying the product, for example, in a stream of heated air or in vacuo at a temperature below the decomposition point of the product.

For the preparation of the monoacylamino derivative, one molecular equivalent of the anhydride, halide or mono-ester acyl halide is employed in place of two molecular equivalents. As an alternative to the diacylamino compounds, mixed acylamino compounds may be prepared by first reacting one molecular equivalent of one of the anhydrides in the group hereinbefore described with the diaminodiphenyl sulfone and then reacting one molecular equivalent of another of the anhydrides in the group hereinbefore described or any other suitable anhydride, for example, acetic anhydride. Also, the order of the substitution may be reversed, for example, first reacting acetic anhydride and then reacting one of the anhydrides in the group hereinbefore described.

The 4,4'-diaminodiphenyl sulfone is desirably obtained by refluxing a mixture of parachloronitrobenzene and sodium sulfide in water, reacting the resulting p-aminothiophenolate with a molecular equivalent of parachloronitrobenzene, acylating the resulting 4-nitro-4'-aminodiphenyl sulfide with acetic anhydride, oxidizing the sulfide to the sulfone, removing the acetyl residue by acid hydrolysis and reducing the 4-nitro-4'-aminodiphenyl sulfone to the diamino compound.

A desirable procedure for obtaining the monoacylamino derivatives of the present invention comprises acylating 4-nitro-4'-aminodiphenyl sulfide with a molecular equivalent of the anhydride of one of the acids selected from the group hereinbefore described, oxidizing the 4-nitro-4'-acylaminodiphenyl sulfide to the sulfone and subsequently reducing the nitro residue to the amine.

A desirable procedure for obtaining the diacylamino derivative of the present invention comprises reducing 4-nitro-4'-aminodiphenyl sulfide to 4,4'-diaminodiphenyl sulfide, acylating the sulfide with two molecular equivalents of the anhydride of one of the acids selected from the group hereinbefore described, and subsequently oxidizing the sulfide to the sulfone.

Both the free acids and the salts of the compounds of the present invention may be employed for therapeutic purposes. Examples of the alkali-metal salts are the sodium and potassium salts of N-acetyl-N'-diglycolyl-4,4'-diaminodiphenyl sulfone. These salts may be prepared, for example, by dissolving a molecular equivalent of the derivative in an aqueous solution of sodium carbonate containing from one to two molecular equivalents of the alkali-metal carbonate and recovering the salt by evaporation of the water. Examples of the alkaline-earth metal salts are the calcium and magnesium salts. The ammonium salts and substituted ammonium salts may also be employed for therapeutic purposes, and also the mixed ammonium and alkali metal or alkaline-earth metal salts. In the therapeutic administration of the derivatives of this invention, the oral method is desirably employed, although parenteral methods may be employed. In the case of parenteral administration, the acid may be dissolved in an aqueous solution containing the salt-forming substance, such as sodium hydroxide, and the solution thus formed may be employed for the treatment.

The following preparations and examples serve to illustrate the general process. It is to be understood, however, that these examples do not limit the invention since other methods for preparing the compounds of this invention are contemplated.

PREPARATION No. 1

*4-nitro-4'-aminodiphenyl sulfide*

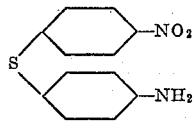

This substance may be prepared according to the method described in J. Am. Chem. Soc., 61, 2763 (1939), in which p-chloronitrobenzene is refluxed with sodium sulfide in aqueous solution, the resulting p-aminothiophenolate is refluxed with a molecular equivalent of p-chloronitrobenzene and the reaction mixture subsequently steam-distilled to remove unchanged p-chloronitrobenzene. The product is crystallized from the nonvolatile portion and recrystallized from alcohol.

PREPARATION No. 2

*4-nitro-4'-aminodiphenyl sulfone*

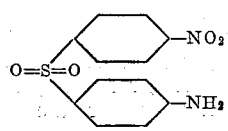

A solution of 187 grams of 4-nitro-4'-aminodiphenyl sulfide, prepared according to the method described under Preparation No. 1, in 510 cc. of glacial acetic acid and 161 cc. of acetic anhydride was refluxed for two hours to effect acetylation of the amino group. 800 cc. of glacial acetic acid was then added and the temperature was adjusted to 90° C. During three hours, 317 cc. of 30% hydrogen peroxide was added dropwise. The temperature was maintained at 90° C. for an additional half hour and the mixture was cooled and diluted with 2500 cc. of water. The crude 4-nitro-4'-acetylaminodiphenyl sulfone was filtered off and washed with water. This product was mixed with 360 cc. of concentrated hydrochloric acid, 1080 cc. of water and 300 cc. of ethyl alcohol. After refluxing for about ten hours, the mixture was cooled to 30° C., and neutralized with 50% soda lye. The precipitated material was filtered off, washed with water and dried at 80° C. Upon analysis, the product was found to be 4-nitro-4'-aminodiphenyl sulfone.

PREPARATION No. 3

*4,4'-diaminodiphenyl sulfide*

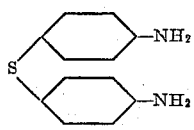

This substance may be prepared according to the method described in J. Am. Chem. Soc., 61, 2763 (1939), in which a suspension of 4-nitro-4'-aminodiphenyl sulfide is treated simultaneously with tin turnings and hydrochloric acid to reduce the nitro group to amino. After the reduction, the product was precipitated from the reaction mixture with alkali, filtered therefrom, refluxed in alcohol and recovered by precipitation with water and filtration. The product may be recrystallized from 50% alcohol.

PREPARATION No. 4

*4,4'-diaminodiphenyl sulfone*

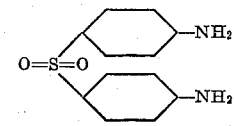

This substance was prepared according to the method described in J. Am. Chem. Soc., 61, 2763 (1939), in which 4,4'-diaminodiphenyl sulfide and acetic anhydride were refluxed and the resulting 4,4'-diacetylaminodiphenyl sulfide was recovered, oxidized to the sulfone with potassium dichromate in the presence of sulfuric acid and glacial acetic acid, recovered from the reaction mixture and the two acetyl radicals hydrolyzed off with the aid of hydrochloric acid. The 4,4'-diaminodiphenyl sulfone is thereupon precipitated by adding sodium carbonate and the precipitate is recovered and washed. The product may be purified by refluxing with aqueous alcohol and the purified product recovered by adding water to the solution, cooling with ice and separating the solid product by filtration. In the acylation step any suitable anhydride, for example, succinic anhydride or propionic anhydride, or the acyl chloride derivatives of succinic or propionic acids, may be utilized.

PREPARATION No. 5

*Diglycolic anhydride*

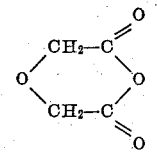

This substance may be prepared according to the method described in Annalen, 259, 190 (1890), in which diglycolic acid is refluxed with acetyl chloride, excess acetyl chloride is distilled off and the residue is dissolved in warm chloroform and crystallized therefrom on cooling.

PREPARATION No. 6

*Thiodiglycolic anhydride*

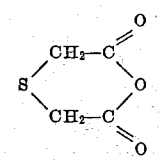

This substance may be prepared according to the method described in Annalen 273, 68 (1893), in which dry thiodiglycolic acid and acetyl chloride are heated, excess acetyl chloride is distilled off and the residue is dissolved in warm chloroform and crystallized therefrom on cooling.

PREPARATION No. 7

*Dithiodiglycolyl dichloride*

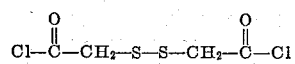

Dithiodiglycolic acid may be prepared according to the method described in German Patent No. 194,039, in which sodium chloracetate and sodium disulfide are reacted and the product is recovered from the reaction mixture. In the preparation of the acyl dichloride, 21.1 grams of dithiodiglycolic acid and 23 grams of thionyl chloride were refluxed in 50 cc. of benzene for three hours. The liquid reaction mixture was decanted from insoluble material and distilled until the solvent and excess thionyl chloride were removed. The residue, dithiodiglycolyl dichloride, may be purified by conventional methods.

As an alternative to the dichloride, the monoester acyl halide, for example, monomethyl dithiodiglycolyl chloride, may be prepared and used. The bromides and other halides of dithiodiglycolic acid may be used. In using the halides and mono-ester halides in preparing the compounds of the present invention, it is necessary, after the amide has been formed, to hydrolyze off the remaining halide residue or mono-ester residue in order to obtain the free carboxyl compound.

PREPARATION No. 8

*Thionyldiglycolic anhydride*

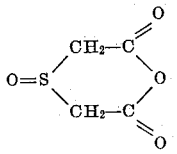

Thionyldiglycolic acid may be prepared according to the method described in J. Chem. Soc. (London), 93, 1834, in which thiodiglycolic acid is treated with an excess of hydrogen peroxide and the product is recovered from the reaction mixture. The anhydride may be prepared according to the methods described in Preparations Nos. 5 and 6.

PREPARATION No. 9

*Sulfondiacetic anhydride*

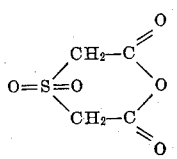

Sulfondiacetic acid may be prepared according to the method described in Berichte 17, 2818, in which thiodiglycolic acid in aqueous alkaline carbonate solution is oxidized with potassium permanganate and the product is recovered from the reaction mixture. The anhydride may be prepared according to the methods in Preparations Nos. 5 and 6.

EXAMPLE I

*N-diglycolyl-4,4'-diaminodiphenyl sulfone*

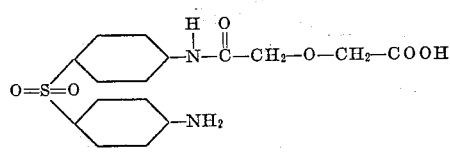

A mixture of 24.6 grams of 4-amino-4'-nitrodiphenyl sulfide, 75 cc. of acetone and 12 grams of diglycolic anhydride was refluxed for two hours and thereafter allowed to stand for ten hours at 25° C. The reaction product, N-diglycolyl-4-amino-4'-nitrodiphenyl sulfide, was crystallized from the mixture as a yellow solid and was filtered off, washed with acetone and dried. The acetone mother liquor was evaporated. Water was added to the residual oil and the mixture was stirred until the oil was solidified. The solid material was filtered, washed with water and dried at 80° C.

A solution of 27.8 grams of this material in 80 cc. of glacial acetic acid was prepared and heated to 90° C. During three hours, 31.7 cc. of 30% hydrogen peroxide was added dropwise to the solution. The temperature was maintained at 90° C. for an additional half hour. Thereafter the mixture was cooled and diluted with 100 cc. of water. The precipitated product was filtered off, washed with water and dried at 80° C. The product of this reaction was N-diglycolyl-4-nitro-4'-aminodiphenyl sulfone.

As an alternative preparation of N-diglycolyl-4-nitro 4'-aminodiphenyl sulfone, a mixture of 27.8 grams of 4-nitro-4'-aminodiphenyl sulfone, 75 cc. of acetone and 12.0 grams of diglycolic anhydride was refluxed for two huors and cooled to 25° C. Upon standing, a yellow solid crystallized out. The product was filtered off, washed with acetone and dried; weight 32 grams. The acetone filtrate was evaporated, the residual oil was treated with 100 cc. of water and the mixture was stirred until the product solidified. The crystals were filtered off, washed with water and dried at 80° C. The total yield was 39.4 grams (100%).

A mixture of 39.4 grams of N-diglycolyl-4-nitro-4'-aminodiphenyl sulfone with 35.7 grams of granulated tin in 250 cc. of alcohol was treated with 250 cc. of 10% hydrochloric acid. The mixture was stirred for four hours at 40°-45° C., filtered, and the tin was removed from the filtrate by treatment with hydrogen sulfide. Excess hydrogen sulfide was dissipated by means of a stream of air or by placing the solution under vacuum. The solution was alkalinized with sodium bicarbonate, evaporated to dryness under reduced pressure and the residue was recrystallized. The product was N-diglycolyl-4,4'-diaminodiphenyl sulfone.

The nitro compound also can be reduced catalytically with hydrogen, using a hydrogenation catalyst.

EXAMPLE II

*N-thiodiglycolyl-4,4'-diaminodiphenyl sulfone*

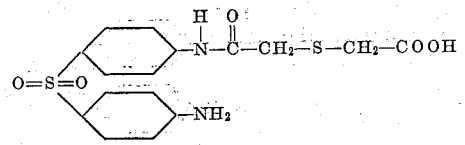

A mixture of 27.8 grams of 4-amino-4'-nitrodiphenyl sulfone, 75 cc. of acetone and 14 grams of thiodiglycolic anhydride was refluxed for two hours. At this time, 100 cc. of water was added and the acetone was evaporated from the mixture. The solid material was filtered off, washed with water and dried at 80° C. The product of this reaction was N-thiodiglycolyl-4-amino-4'-nitrodiphenyl sulfone. A mixture of 41.0 grams of this product with 35.7 grams of granulated tin in 250 cc. of alcohol was stirred with 250 cc. of 10% hydrochloric acid at 40°-45° C. for four hours. Solids were removed by filtration and the filtrate was freed from tin by treatment with hydrogen sulfide. Excess hydrogen sulfide was dissipated by means of a stream of air or by placing the solution under vacuum. The solution was alkalinized with sodium bicarbonate, evaporated to dryness under reduced pressure and the residue was purified by recrystallization.

The nitro compound also may be reduced with hydrogen using a hydrogenation catalyst and some suitable solvent, such as an alcohol, dioxane, etc.

EXAMPLE III

*N-dithiodiglycolyl-4,4'-diaminodiphenyl sulfone*

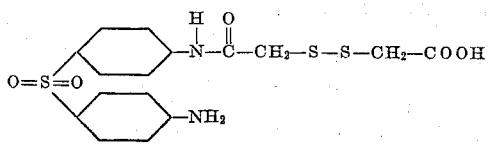

This product may be prepared according to the method of Example II, using monomethyl dithiodiglycolyl chloride in place of thiodiglycolic anhydride, with corresponding changes in the stoichiometrical proportions. The monomethyl residue of the derivative as thus prepared may be hydrolyzed off by conventional methods, for example, by refluxing the material in acetone solution with caustic soda.

EXAMPLE IV

*N-thionyldiglycolyl-4,4'-diaminodiphenyl sulfone*

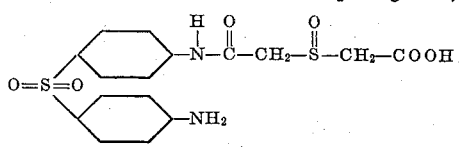

This product may be prepared according to the method of Example II, using thionyldiglycolic anhydride in place of thiodiglycolic anhydride, with corresponding changes in the stoichiometrical proportions.

EXAMPLE V

*N-sulfondiacetyl-4,4'-diaminodiphenyl sulfone*

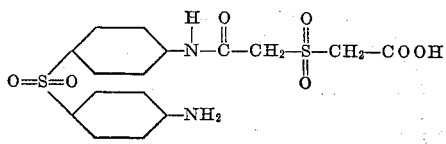

This compound may be prepared according to the method of Example I, replacing diglycolic anhydride with sulfondiacetic anhydride.

It is further a feature of this invention that sulfondiacetic anhydride may be replaced with thiodiglycolic anhydride and the sulfide radicals of the thiodiglycolyl and aminodiphenyl sulfide residues oxidized simultaneously with an excess of hydrogen peroxide to the corresponding sulfones. For example, the diglycolic anhydride of Example I may be replaced with 14 grams of thiodiglycolic anhydride and the quantity of 30% hydrogen peroxide increased to 63.4 cc., or twice that required for the oxidation of one sulfide residue to the corresponding sulfone residue.

EXAMPLE VI

*N - thiodiglycolyl-N'-acetyl-4,4'-diaminodiphenyl sulfone*

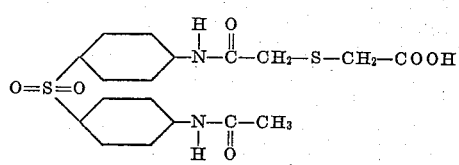

A mixture of 41 grams of N-thiodiglycolyl-4,4'-diaminodiphenyl sulfone, prepared according to the method of Example II, 75 cc. of acetone and 11 grams of acetic anhydride was refluxed for two hours. 100 cc. of water was added and the acetone was evaporated. The solid material was filtered off, washed with water and dried at 80° C. The product was N-thiodiglycolyl-N'-acetyl-4,4'-diaminodiphenyl sulfone.

As an alternative procedure, a molecular equivalent of N-acetyl-4,4'-diaminodiphenyl sulfone, prepared according to the method described in J. Am. Chem. Soc., 61, 2763 (1939), or the method described in United States Patent No. 2,260,626, issued October 28, 1941 to Kleiderer and Van Arendonk, may be reacted with a molecular equivalent of thiodiglycolic anhydride, using the method of the present example, to produce the product, N - acetyl - N'-thiodiglycolyl-4,4'-diaminodiphenyl sulfone, which is identical with the product described hereinbefore in the present example.

Other mixed N-acyl-4,4'-diaminodiphenyl sulfone compounds embodying the acyl residues derived from the anhydrides described herein may also be prepared by the methods described in the aforedescribed examples. Among these acyl derivatives are the following:

N-diglycolyl-N'-acetyl
N-thiodiglycolyl-N'-acetyl
N-dithiodiglycolyl-N'-acetyl
N-thionyldiglycolyl-N'-acetyl
N-sulfondiacetyl-N'-acetyl In place of the anhydrides described hereinbefore, the acyl halides or the mono-ester acyl halides of the acids may be employed. In this event, after condensation of the acyl dihalide or the mono-ester acyl halide with an amino group, the hydrolysis of the residual halide or mono-ester residue is made necessary in order to expose the free carboxyl radical of the acid residue.

As a further alternative, the diaminodiphenyl sulfone or 4-nitro-4'-aminodiphenyl sulfone may be condensed with the acid directly, forming first an amine salt and subsequently dehydrating the amine salt with the aid of heat and, if desired, a dehydration catalyst to accelerate the reaction. The dehydration reaction may be conducted at reduced pressure.

The derivatives of the present invention may be recovered as the hydrates. For example, N,N'-dithiodiglycolyl-4,4'-diaminodiphenyl sulfone may be recovered as the dihydrate and N,N'-di-diglycolyl-4,4'-diaminodiphenyl sulfone as the trihydrate. This water of hydration may be removed by heating the respective compounds in a stream of heated air or in vacuo below the temperature at which decomposition begins.

I claim:

1. A substituted 4,4'-diaminodiphenyl sulfone which is represented by the formula:

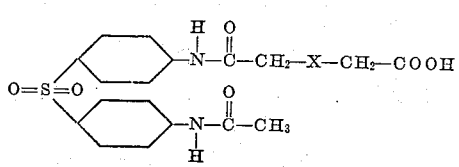

in which

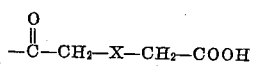

represents a residue selected from the group consisting of diglycolyl, thiodiglycolyl, dithiodiglycolyl, thionyldiglycolyl and sulfondiacetyl residues.

2. The product set forth in claim 1 in which the carboxyl hydrogen is replaced by a metal ion selected from the group consisting of alkali-metal, alkaline-earth metal, ammonium and substituted ammonium ions.

3. N-thiodiglycolyl-N'-acetyl-4,4'-diaminodiphenyl sulfone.

4. N-diglycolyl-N'-acetyl-4,4'-diaminodiphenyl sulfone.

5. N-dithiodiglycolyl-N'-acetyl-4,4'-diaminodiphenyl sulfone.

6. The sodium salt of N-thiodiglycolyl-N'-acetyl-4,4'-diaminodiphenyl sulfone.

7. The sodium salt of N-diglycolyl-N'-acetyl-4,4'-diaminodiphenyl sulfone.

8. The sodium salt of N-dithiodiglycolyl-N'-acetyl-4,4'-diaminodiphenyl sulfone.

LUCAS P. KYRIDES.